(No Model.)

L. BELL.
METHOD OF AND MEANS FOR STARTING ALTERNATING CURRENT MOTORS.

No. 520,764.  Patented June 5, 1894.

Witnesses
A. F. Macdonald
J. J. Johnston

Inventor
Louis Bell by
Bentley and Blodgett
Attys.

UNITED STATES PATENT OFFICE.

LOUIS BELL, OF BOSTON, MASSACHUSETTS, ASSIGNOR TO THE GENERAL ELECTRIC COMPANY, OF SAME PLACE.

METHOD OF AND MEANS FOR STARTING ALTERNATING-CURRENT MOTORS.

SPECIFICATION forming part of Letters Patent No. 520,764, dated June 5, 1894.

Application filed July 3, 1893. Serial No. 479,457. (No model.)

*To all whom it may concern:*

Be it known that I, LOUIS BELL, a citizen of the United States, residing in Boston, in the county of Suffolk, State of Massachusetts, have invented certain new and useful Improvements in Methods of and Means for Starting Alternating-Current Motors, of which the following is a specification.

My invention relates to methods and means for starting single-phase alternating current electric motors; and has for its object to so arrange the starting mechanism that such motors shall have considerable torque at starting, or be capable of starting under load, it being especially adapted to the case of alternating current induction motors comprising an inducing element such as a field magnet coil or coils conveying the alternating current, and an induced element such as an armature wound with closed circuited conductors. In such motors the high self-induction of the coils when the armature is at rest acts to prevent any considerable flow of current at a normal working potential. To the ends pointed out I provide a suitable switching mechanism whereby the arrangement of the coils or windings upon the motor may be so modified that at starting the resistance of the motor coils is so reduced that an increased current flows through them and its power is increased. After the motor has reached speed, the switching mechanism restores the circuit to its normal running condition. Similar results may be accomplished by arranging the circuits of the secondary of the transformer, thus varying the potential of the current supplied to the motor and such an arrangement I consider within the scope of my invention, although not claimed specifically herein, it being illustrated, described and claimed in my pending application, Serial No. 503,258, filed March 12, 1894.

Figure 1:
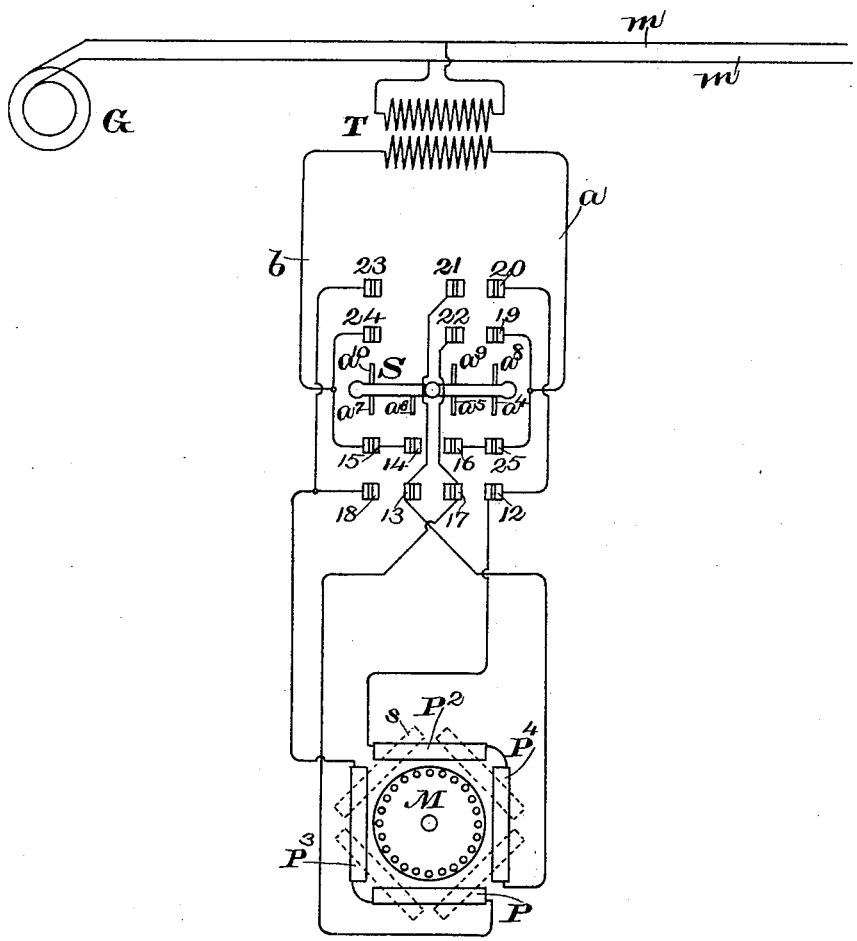
Figure 2:
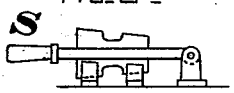

In the accompanying drawings, Figure 1 is a diagrammatic illustration of my invention. Fig. 2 is a side elevation of a form of switch which may be employed.

Referring by letter, G is a generator of single-phase alternating currents, which are fed to lines or mains $m$, $m'$, and thence to the transformer T reducing the potential of the current before it is supplied to the electric motor M connected to the secondary circuit. In this secondary circuit is a switch S, which is illustrated as a double-pole, double-throw jack-knife switch with its blades in a vertical position, this being a form of switch well adapted to the purposes of my invention. The particular form of switching mechanism is immaterial, it being only necessary that it shall be capable of throwing the coils into series or multiple.

P, $P^2$, $P^3$, $P^4$ are the coils of the motor, the various contacts of the switch being numbered 12 to 25. Assuming that the switch is thrown toward the motor M to close the circuits, the proper connections for starting the motor will be made, and the path of the current will be as follows: line $a$, contact 25, switch-blade $a^4$, contact 12, coils $P^2$ and $P^4$ to contact 13, switch-blade $a^6$, contacts 14 and 15, and out by the line $b$; the path of the current through the coils P and $P^3$ being in multiple with the path through the coils $P^2$, $P^4$, in the following manner: by the line $a$, contact 16, switch-blade $a^5$, contact 17, through the coils P, $P^3$, contact 18, switch-blade $a^7$, contact 15, and out by the line $b$. Assuming the switch to be thrown away from the motor, thus restoring the coils to their series position or in the proper connection for the normal running of the motor, the circuit is as follows: entering by the line $a$, thence by contact 19, by the switch-blade $a^8$, contact 20, to contact 12, by the cross connection through the coils $P^2$, $P^4$ to contact 13, thence to contact 21, by the switch-blade $a^9$ to the contact 22, to the contact 17, through the coils P, $P^3$, to the contact 23, by the switch-blade $a^{10}$, to the contact 24, and out by the line $b$. The motor may be of the shaded pole type, such as is described in the patents to Elihu Thomson, Nos. 363,186 and 428,650, the shading or short-circuited coils of the field being indicated at $s$.

Having thus described my invention, what I claim, and wish to protect by Letters Patent of the United States, is—

1. The method of operating an alternating current motor, which consists in arranging its inducing coils in multiple at starting and when the speed rises, throwing the coils into series.

2. In combination, an alternating current induction motor, and a switching mechanism adapted to connect its inducing coils in series or multiple.

In witness whereof I have hereunto set my hand this 29th day of June, 1893.

LOUIS BELL.

Witnesses:
JOHN W. GIBBONEY,
BENJAMIN B. HULL.